(12) United States Patent
Desai et al.

(10) Patent No.: US 11,842,524 B2
(45) Date of Patent: Dec. 12, 2023

(54) MULTI-MODAL LEARNING BASED INTELLIGENT ENHANCEMENT OF POST OPTICAL CHARACTER RECOGNITION ERROR CORRECTION

(71) Applicant: International Business Machines Corporation, Armonk, NY (US)

(72) Inventors: Rajesh M. Desai, San Jose, CA (US); Ayush Utkarsh, Ranchi (IN); Nazrul Islam, San Jose, CA (US); Praveen Vyas, Behind Indan Gas Godown (IN)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 17/245,349

(22) Filed: Apr. 30, 2021

(65) Prior Publication Data
US 2022/0350998 A1    Nov. 3, 2022

(51) Int. Cl.
*G06K 9/03* (2006.01)
*G06V 10/40* (2022.01)
(Continued)

(52) U.S. Cl.
CPC ............ *G06V 10/40* (2022.01); *G06F 18/213* (2023.01); *G06F 18/214* (2023.01);
(Continued)

(58) Field of Classification Search
CPC ........ G06V 10/40; G06V 10/70; G06V 10/74; G06V 10/75; G06V 10/761; G06V 10/768;
(Continued)

(56) References Cited

U.S. PATENT DOCUMENTS

| | | | | |
|---|---|---|---|---|
| 10,558,893 B2* | 2/2020 | Bluche | ............... | G06V 30/373 |
| 10,936,863 B2* | 3/2021 | Simantov | ............ | G06V 30/412 |
| 2021/0264218 A1* | 8/2021 | Odate | ............... | G06V 30/1983 |

FOREIGN PATENT DOCUMENTS

CN          107463928 A       12/2017

OTHER PUBLICATIONS

Wang Ling et al., "Finding Function in Form: Compositional Character Models for Open Vocabulary Word Representation", arXiv, arXiv:1508.02096v2, May 2016, pp. 1-11 (Year: 2016).*

(Continued)

*Primary Examiner* — Eric Rush
(74) *Attorney, Agent, or Firm* — Stephen J. Walder, Jr.; Matt Zebrec

(57) ABSTRACT

A mechanism is provided for implementing an optical character recognition (OCR) error correction mechanism for correcting OCR errors. Responsive to receiving a document in which OCR has been performed, the mechanism assesses the document to identify a set of OCR errors generated by an OCR engine that performed the OCR using a set of visual embeddings. Responsive to identifying the set of OCR errors, the mechanism analyzes each character of a plurality of sentences within the document to generate a high-dimensional embedding for the characters of the plurality of sentences within the document. The mechanism then linguistically corrects each OCR error in the set of OCR error. The mechanism utilizes ground truth information and the set of visual embeddings to verify that character stream is linguistically correct. Responsive to verifying that the character stream is linguistically correct, the mechanism outputs an OCR error corrected document to a user.

20 Claims, 7 Drawing Sheets

(51) Int. Cl.

| | |
|---|---|
| *G06F 40/126* | (2020.01) |
| *G06F 40/109* | (2020.01) |
| *G06N 20/00* | (2019.01) |
| *G06F 40/232* | (2020.01) |
| *G06V 30/10* | (2022.01) |
| *G06F 18/214* | (2023.01) |
| *G06V 30/19* | (2022.01) |
| *G06V 30/12* | (2022.01) |
| *G06V 10/82* | (2022.01) |
| *G06V 30/26* | (2022.01) |
| *G06F 18/213* | (2023.01) |
| *G06N 3/0464* | (2023.01) |
| *G06N 3/0442* | (2023.01) |
| *G06N 3/0455* | (2023.01) |
| *G06V 10/98* | (2022.01) |
| *G06F 40/279* | (2020.01) |
| *G06V 30/242* | (2022.01) |

(52) U.S. Cl.
CPC .......... *G06F 40/109* (2020.01); *G06F 40/126* (2020.01); *G06F 40/232* (2020.01); *G06F 40/279* (2020.01); *G06N 3/0442* (2023.01); *G06N 3/0455* (2023.01); *G06N 3/0464* (2023.01); *G06N 20/00* (2019.01); *G06V 10/82* (2022.01); *G06V 10/98* (2022.01); *G06V 30/10* (2022.01); *G06V 30/12* (2022.01); *G06V 30/19* (2022.01); *G06V 30/242* (2022.01); *G06V 30/26* (2022.01)

(58) Field of Classification Search
CPC ...... G06V 10/82; G06V 10/98; G06V 10/987; G06V 20/62; G06V 30/00; G06V 30/10; G06V 30/12; G06V 30/127; G06V 30/18; G06V 30/19; G06V 30/22; G06V 30/24; G06V 30/242; G06V 30/244; G06V 30/246; G06V 30/248; G06V 30/2528; G06V 30/26; G06V 30/262; G06V 30/268; G06V 30/274; G06V 30/40; G06V 30/41; G06F 11/00; G06F 11/006; G06F 18/20; G06F 18/21; G06F 18/213; G06F 18/214; G06F 18/217; G06F 18/22; G06F 18/28; G06F 18/30; G06F 40/10; G06F 40/109; G06F 40/126; G06F 40/129; G06F 40/20; G06F 40/205; G06F 40/211; G06F 40/216; G06F 40/226; G06F 40/232; G06F 40/237; G06F 40/279; G06F 40/284; G06F 40/30; G06F 40/58; G06N 3/044; G06N 3/0442; G06N 3/0455; G06N 3/0464; G06N 3/084; G06N 3/096; G06N 20/00
USPC ................ 382/100–102, 105, 114, 135–138, 382/155–157, 159–161, 181, 182, 382/185–187, 224, 229–231, 309–311, 382/321, 325; 704/1, 2, 8–10
See application file for complete search history.

(56) References Cited

OTHER PUBLICATIONS

Malykh et al., "Robust Word Vectors: Context-Informed Embeddings for Noisy Texts", Proceedings of the 2018 EMNLP Workshop W-NUT: The 4th Workshop on Noisy User-generated Text, 2018, pp. 54-63 (Year: 2018).*

Yuval Pinter, Robert Guthrie, Jacob Eisenstein, "Mimicking Word Embeddings using Subword RNNs", arXiv, arXiv:1707.06961v1, Jul. 2017, pp. 1-11 (Year: 2017).*

Allen Schmaltz, Yoon Kim, Alexander M. Rush, Stuart M. Shieber, "Sentence-Level Grammatical Error Identification as Sequence-to-Sequence Correction", arXiv, arXiv:1604.04677v1, Apr. 2016, pp. 1-10 (Year: 2016).*

Afli, Haithem et al., "OCR Error Correction Using Statistical Machine Translation", International Journal of Computational Linguistics and Applications vol. 7, No. 1, Apr. 2016, 17 pages.

Bassil, Youssef et al., "OCR Context-Sensitive Error Correction Based on Google Web 1T 5-Gram Data Set", American Journal of Scientific Research, ISSN 1450-223X, Issue. 50, Feb. 2012, 13 pages.

Bassil, Youssef et al., "OCR Post-Processing Error Correction Algorithm Using Google's Online Spelling Suggestion", Journal of Emerging Trends in Computing and Information Sciences, ISSN 2079-8407, vol. 3, No. 1, Jan. 2012, 9 pages.

Drobac, Senka, "OCR and post-correction of historical newspapers and journals", University of Helsinki, Oct. 9, 2020, 78 pages.

Grouin, Cyril et al., "Generating a Training Corpus for OCR Post-Correction Using Encoder-Decoder Model", Proceedings of the 8th International Joint Conference on Natural Language Processing, Taipei, Taiwan, Nov. 27-Dec. 1, 2017, 9 pages.

Kissos, Ido et al., "OCR Error Correction Using Character Correction and Feature-Based Word Classification", 2016 12th IAPR Workshop on Document Analysis Systems (DAS), Apr. 11-14, 2016, 6 pages.

Meng, Yuxian et al., "Glyce: Glyph-vectors for Chinese Character Representations", arXiv:1901.10125v5 [cs.CL] May 21, 2020, 12 pages.

Saluja, Rohit et al., "Sub-Word Embeddings for OCR Corrections in Highly Fusional Indic Languages", 2019 International Conference on Document Analysis and Recognition (ICDAR), Sep. 20-25, 2019, 6 pages.

Wick, Michael L. et al., "Context-Sensitive Error Correction: Using Topic Models to Improve OCR", Ninth International Conference on Document Analysis and Recognition (ICDAR 2007), Sep. 23-26, 2007, 5 pages.

\* cited by examiner

*FIG. 4*

MULTI-MODAL LEARNING BASED INTELLIGENT ENHANCEMENT OF POST OPTICAL CHARACTER RECOGNITION ERROR CORRECTION

BACKGROUND

The present application relates generally to an improved data processing apparatus and method and more specifically to computer mechanisms for multi-modal learning based intelligent enhancement of post optical character recognition (OCR) error correction.

Optical character recognition (OCR) is an electronic or mechanical conversion of images of typed, handwritten, or printed text, whether from a scanned document, a photo of a document, a scene-photo (for example, text on signs or billboards in a landscape photo), or from subtitle text superimposed on an image (for example, from a television broadcast), into machine-encoded text.

Widely used as a form of data entry from printed paper data records—whether passport documents, invoices, bank statements, computerized receipts, business cards, mail, printouts of static-data, or any suitable documentation—OCR is a common method of digitizing printed texts so that they may be electronically edited, searched, stored more compactly, displayed on-line, and used in machine processes such as cognitive computing, machine translation, (extracted) text-to-speech, key data and text mining.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer-implemented method is provided, in a data processing system comprising at least one processor and at least one memory, the at least one memory comprising instructions executed by the at least one processor to cause the at least one processor to implement an optical character recognition (OCR) error correction mechanism for correcting OCR errors in a document system. In the illustrative embodiment, a document is assessed to identify a set of OCR errors generated by an OCR engine that performed the OCR on the document using a set of visual embeddings in response to receiving the document in which OCR has been performed. The illustrative embodiment analyzes each character of a plurality of sentences within the document to generate a high-dimensional embedding for the characters of the plurality of sentences within the document in response to identifying the set of OCR errors. The illustrative embodiment linguistically corrects each OCR error in the set of OCR error by: breaking down the high-dimensional embedding into a sequence of vectors; and converting the sequence of vectors into a character stream where each character in the character stream is identified based on a proximity of an associated vector to decoder character embeddings. The illustrative embodiment utilizes ground truth information and the set of visual embeddings to verify that character stream is linguistically correct. The illustrative embodiment outputs an OCR error corrected document to a user in response to verifying that the character stream is linguistically correct.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts one example of a language specific character-set 28×28 pixel JPEG image 402 of all the characters in a selected language vocabulary for a given number and types of fonts in accordance with an illustrative embodiment;

DETAILED DESCRIPTION

Figure 1:
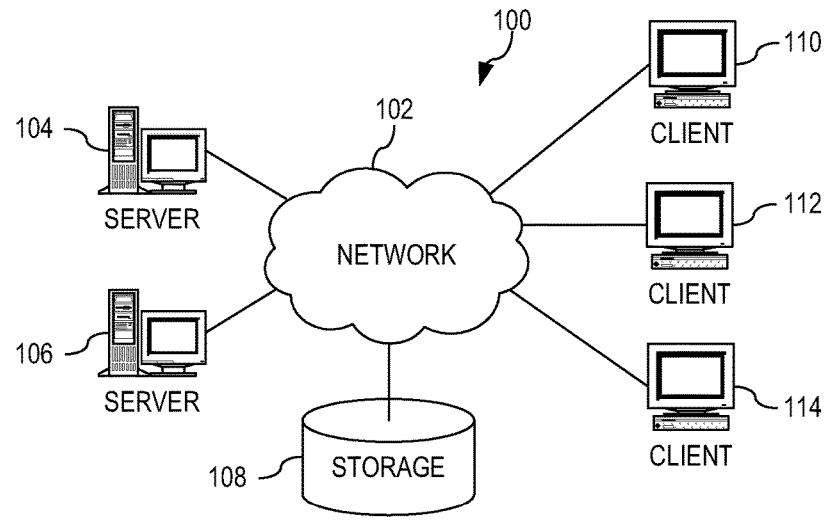
FIG. 1 is an example diagram of a distributed data processing system in which aspects of the illustrative embodiments may be implemented.

As discussed above, optical character recognition (OCR) is an electronic or mechanical conversion of images of typed, handwritten, or printed text, whether from a scanned document, a photo of a document, a scene-photo (for example, text on signs or billboards in a landscape photo), or from subtitle text superimposed on an image (for example, from a television broadcast), into machine-encoded text.

There are two basic types of core OCR algorithms utilized in OCR, which may produce a ranked list of candidate characters: matrix matching and feature extraction.

Matrix matching involves comparing an image to a stored glyph on a pixel-by-pixel basis; it is also known as "pattern matching", "pattern recognition", or "image correlation". This relies on the input glyph being correctly isolated from the rest of the image, and on the stored glyph being in a similar font and at the same scale. This technique works best with typewritten text and does not work well when new fonts are encountered. This is the technique the early physical photocell-based OCR implemented, rather directly.

Feature extraction decomposes glyphs into "features" like lines, closed loops, line direction, and line intersections. The extraction features reduces the dimensionality of the representation and makes the recognition process computationally efficient. These features are compared with an abstract vector-like representation of a character, which might reduce to one or more glyph prototypes. General techniques of feature detection in computer vision are applicable to this type of OCR, which is commonly seen in "intelligent" handwriting recognition and indeed most modern OCR software. Nearest neighbor classifiers such as the k-nearest neighbors algorithm are used to compare image features with stored glyph features and choose the nearest match.

However, both of these basic types of OCR algorithms, as well of the other types of OCR algorithms utilized in OCR, still have an error rate due to poor scanning, blurry images, machine generating document errors (device errors), rough handling of physical copies, types of fonts, font properties, or the like, on which the OCR is performed.

In order to address the accuracy of the OCR algorithm, in one instance of current systems, output may be constrained by a lexicon—a list of words that are allowed to occur in a document. This might be, for example, all the words in the English language, or a more technical lexicon for a specific field. However, this technique may be problematic if the document contains words not in the lexicon, like proper nouns. In another instance of current systems, "near-neighbor analysis" may be utilized that employs co-occurrence frequencies to correct errors, by noting that certain words are often seen together. For example, "Washington, D.C." is generally far more common in English than "Washington DOC". Other methods to fix OCR errors in documents may include, for example, natural language processing (NLP) pythonic libraries with keyboard bias or deep neural network models capable of learning the linguistic context. However, these OCR error correction implementations still result in an error rate of 5% (95% accuracy) or worse if the measurement is based on whether each whole word was recognized with no incorrect letters.

In order to address the deficiencies of the current systems, the illustrative embodiments provide optical character recognition (OCR) error correction mechanisms that enhance post OCR error correction by inculcating information from linguistic and visual modes. That is, most OCR errors occur due to similarity amongst characters in a visual domain. In order to predict correct options for the OCR error, the instant OCR error correction mechanisms provide for learning the linguistic context of the input word stream. In order to learn from visual as well as linguistic domains, the OCR error correction mechanisms provide a two-step architecture which utilizes information from multiple modes to enhance predictions. That is, the instant OCR error correction mechanisms uses visual information of characters (in various fonts, font properties, or the like) to enhance linguistic error corrections by utilizing visual embeddings of characters as the embedding layer of an attention based bi-directional deep long-short term memory (LSTM) model. Therefore, the OCR error correction mechanisms are trained on multiple languages with varying characters and fonts. The OCR error correction mechanisms is agnostic of prior art mechanisms that use logographic languages and does not look for recurring patterns design in similar words. The OCR error correction mechanisms are also independent of the OCR engine and may be extended to all different fonts used by the user.

Thus, the illustrative embodiments provide an improved computing tool that provides improved functionality for enhancing post OCR error correction. The improvements provide mechanisms that uses visual information of characters (in various fonts and font properties) to enhance linguistic error corrections by utilizing visual embeddings of characters as the embedding layer of an attention based bi-directional deep LSTM model. As a result, the improvements are effective in correcting post OCR error with accuracy far above current OCR error correction implementations. Moreover, the improvements provided by the improved computing tool and improved computing tool functionality aid in correcting post OCR errors regardless of the OCR engine that performed the OCR.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
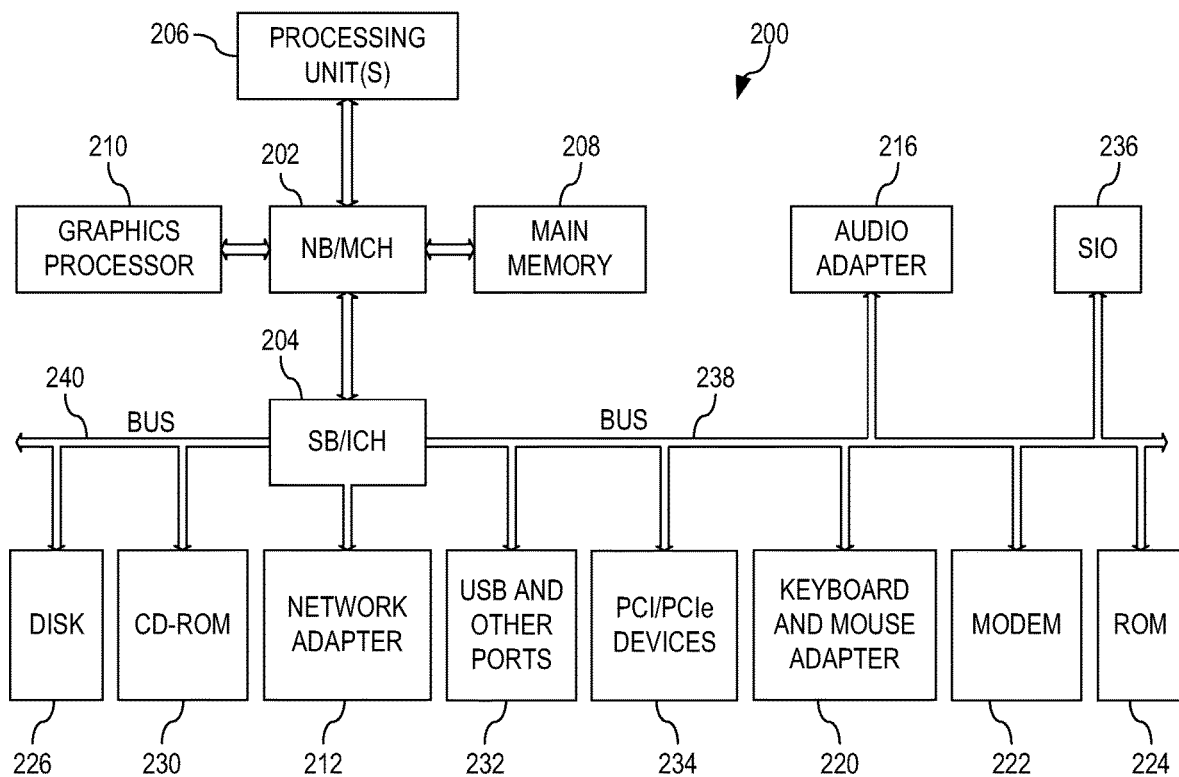
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement optical character recognition (OCR) error correction mechanisms. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates enhancing post OCR error correction by inculcating information from linguistic and visual modes.

It should be further appreciated that the data processing system may be configured to act as a cognitive system which is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, identification of related concepts within different portions of content in a corpus, intelligent search algorithms, such as Internet web page searches, for example, identifying character datasets, font types, properties of fonts, or the like. It should be appreciated that the cognitive system may be trained and/or configured to process an out from an OCR engine utilizing the particular character dataset, font type, font properties, or the like, with which the cognitive system is trained, in order to enhance post OCR error correction by inculcating information from linguistic and visual modes.

As noted above, the mechanisms of the illustrative embodiments utilize specifically configured computing devices, or data processing systems, to perform the operations for enhancing post OCR error correction by inculcating information from linguistic and visual modes. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the optical character recognition (OCR) error correction mechanisms that enhance post OCR error correction by inculcating information from linguistic and visual modes.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
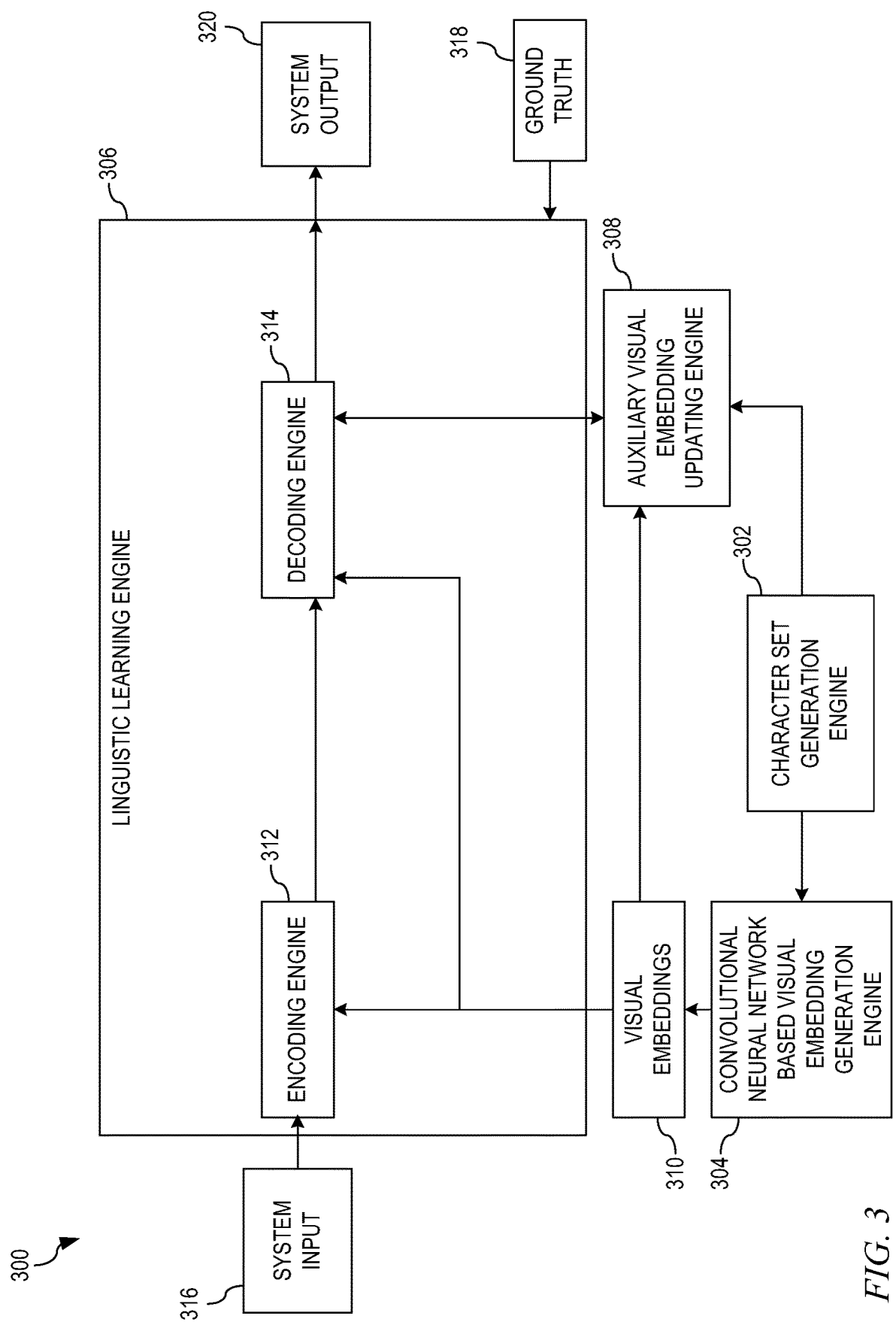
FIG. 3 depicts one example of a functional block diagram of an optical character recognition (OCR) error correction mechanism that enhances post OCR error correction by inculcating information from linguistic and visual modes in accordance with an illustrative embodiment.

FIG. 3 depicts one example of a functional block diagram of an optical character recognition (OCR) error correction mechanism that enhances post OCR error correction by inculcating information from linguistic and visual modes in accordance with an illustrative embodiment. Optical character recognition (OCR) error correction mechanism 300 comprises character set generation engine 302, convolutional neural network (CNN) based visual embedding generation engine 304, linguistic learning engine 306, and auxiliary visual embedding updating engine 308.

Initially, character set generation engine 302 generates language specific character sets for a selected set of languages, fonts, font types, font parameters, and the like. The selected set of languages, fonts, font types, font parameters, and the like may be provided as an input to the character set generation engine 302 from the user, as a predefined set of parameters, or the like. In one instance, character set generation engine 302 generates the language specific character sets by printing American Standard Code for Information Interchange (ASCII) characters as a Joint Photographic Experts Group (JPEG) file, i.e. a visual image. FIG. 4 depicts one example of a language specific character-set 28×28 pixel JPEG image 402 of all the characters in a selected language vocabulary for a given number and types of fonts in accordance with an illustrative embodiment. The character set generation engine 302 may generate language specific character sets in many different ways and may generate any size of JPEG images (the 28×28 pixel JPEG image 402 of FIG. 4 is only one example). Further, the exemplary image 402 in FIG. 4 using ASCII characters may be extended to Unicode Transformation Format, such as UTF-8, UTF-16, or the like, to account for non-Latin languages, such as Hindi, Chinese, or the like. Character set generation engine 302 then provides each of the selected language specific character set visual images to CNN based visual embedding generation engine 304.

Figure 5:
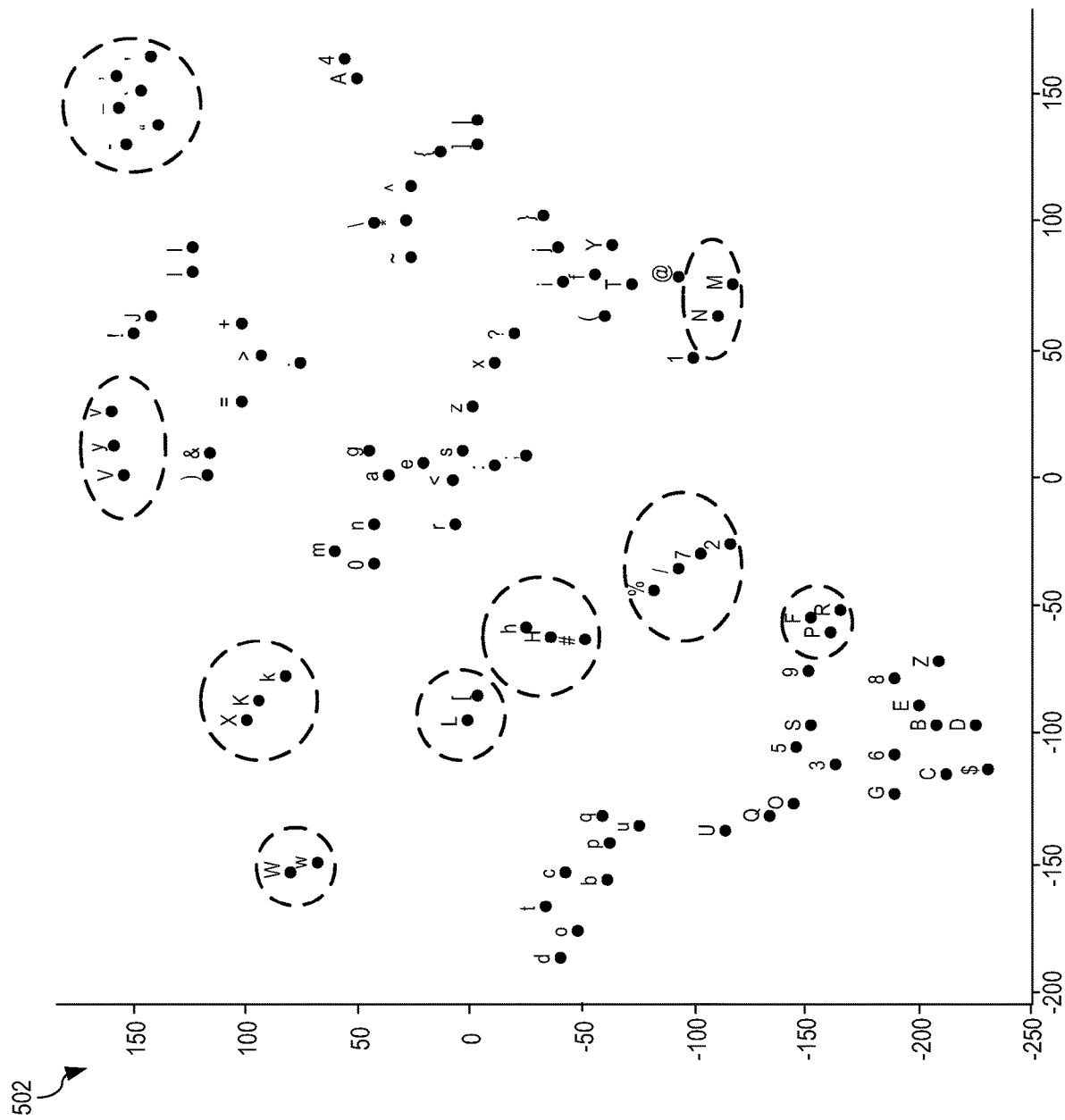
FIG. 5 depicts one example of a t-SNE plot showing embeddings of similar looking characters being clustered together, as indicated by the dashed clusters, in accordance with an illustrative embodiment.

CNN based visual embedding generation engine 304, which is a deep convolutional neural network developed and trained to predict, for example, Modified National Institute of Standards and Technology (MNIST) datasets or Extended Modified National Institute of Standards and Technology (EMNIST) datasets with an accuracy of ~99%, utilizes each of the selected language specific character set visual images to generate an embedding for a visual image of each character in the associated selected language specific character set. The embedding may be of any dimension starting with 16 bit and going up by any power of 2. Each of these embeddings comprises visual information about characters, such as whether a character is made up of straight lines or arcs, number and combinations of such elementary blocks used to construct a particular character and the likes of CNN based visual embedding generation engine 304 then encodes this learned information into a fixed length vector, called visual embeddings. CNN based visual embedding generation engine 304 generates embeddings for all images of a character created by permuting various fonts, sizes, and capitalization. CNN based visual embedding generation engine 304 then generates a final single visual embedding for each character by taking the average of all the associated embeddings. CNN based visual embedding generation engine 304 then generates a t-distributed stochastic neighbor embedding (t-SNE) plot of the embeddings to identify similar looking characters being clustered together in order to verify that the visual clues in the language specific dataset are identified correctly. FIG. 5 depicts one example of a t-SNE plot showing embeddings of similar looking characters being clustered together, as indicated by the dashed clusters, in accordance with an illustrative embodiment.

The CNN based visual embedding set generated by CNN based visual embedding generation engine 304 is then used as an embedding layer for a character-level deep long short-term memory (LSTM) model based linguistic learning engine 306. Linguistic learning engine 306 may be based on any encoder-decoder based deep learning architecture that takes a stream of characters as input and generates a correct stream of characters as output. In one instance it's a long short-term memory (LSTM) model. Linguistic learning engine 306 is constructed at a character level and not word-level to tackle the known problem of out-of-dictionary words for deep learning based linguistic models. That is, OCR/spelling errors tend to create new words with no meaning, hence these words have no valid reference for a model working at word-level and are thus out of dictionary (knowledge space) (example: the word 'grass' is read as 'g+a55' by the OCR which is not a valid word). Traditionally, the starting embeddings for any linguistic learning engine are either generated randomly or picked up from another language model. However, linguistic learning engine 306 uses the visual embedding-set generated from CNN based visual embedding generation engine 304. Thus, the information learned by CNN based visual embedding generation engine 304 from a visual domain provides a starting point for linguistic learning engine 306 to utilize inherent correlations amongst characters in terms of how they appear visually to predict corrections for the input stream of characters. These critical correlations are otherwise invisible in the linguistic domain and by adopting embeddings from CNN based visual embedding generation engine 304, linguistic learning engine 306 is able to mine them.

In one instance, CNN based visual embedding generation engine 304 utilizes training to generate the trained model. That is, CNN based visual embedding generation engine 304 is trained by extracting visual features using 4 convolutional (Cony) layers, 2 fully connected (FC) layers, and 4 maxpool (MP) layers, such that output of a first Cony layer is fed to a first MP layer, the output of the first MP layer is fed to a second Cony layer, the output of the second Cony layer is fed to a second MP layer, the output of the second MP layer is fed to a third Cony layer, the output of the third Cony layer is fed to a third MP layer, the output of the third MP layer is fed to a fourth Cony layer, the output of the fourth Cony layer is fed to a fourth MP layer, the output of the fourth MP layer is fed to a first FC layer, and the output of the first FC layer is fed to a second FC layer, which ultimately provides an output. Each Convolutional Layer computes the convolutional operation of the input image using fixed-size kernel filters with learnable weights to extract fundamental features. The size of kernels is a variable. In one instance the size of the kernels was set to 3×3. Max pooling is a sample-based discretization process. The objective of each Max Pooling Layer is to down-sample an input representation (image, hidden-layer output matrix, or the like), by reducing the input representation's dimensionality and allowing for assumptions to be made about features contained in the sub-regions binned. This is done by utilizing a fixed-size kernel. For each of the regions represented by the kernel, the maximum value in that region is taken and a new, output matrix is created where each element is the maximum of a region in the original input. Each Fully Connected Layer in neural networks is a layer where all the inputs from one layer are connected to every activation unit of the next layer. A dropout of 0.5 was applied to every convolutional layer during training. A dropout in neural networks is a regularization method that approximates training a large number of neural networks with different architectures in parallel. During training, some number of layer outputs are randomly ignored or "dropped out." This has the effect of making the layer look-like and be treated-like a layer with a different number of nodes and connectivity to the prior layer. In effect, each update to a layer during training is performed with a different "view" of the configured layer. CNN based visual embedding generation engine 304 then utilizes a softmax layer while training to perform classification on a dataset. The softmax layer turns an input vector of K real values into a vector of K real values that sum to 1. The input may be negative, positive, or even 0, but the output produced is always between 0 and 1, for interpretations as probabilities. Hence, a softmax layer is used to classify an input as one out of the available classes for the problem based on the highest probability. The softmax formula is as follows:

$$\sigma(\vec{z})i = \frac{e^{z_i}}{\sum_{j=1}^{K} e^{z_j}}$$

where all the $z_i$ values are the elements of the input vector and may take any real value. The term on the bottom of the formula is the normalization term which ensures that all the output values of the function will sum to 1, the constituting a valid probability distribution. The result of the training with the language specific dataset is a trained model that provides greater than 99% accuracy when utilized to correct OCR errors. CNN based visual embedding generation engine 304 then uses the trained model to extract visual embeddings 310 for the character set as previously explained and uploads visual embeddings 310 to linguistic learning engine 306 for use by both encoding engine 312 and decoding engine 314.

Once visual embeddings 310 have been received, linguistic learning engine 306 initializes encoding engine 312 and decoding engine 314. Linguistic learning engine 306 is trained using a language training dataset containing a tuple of input and ground-truth, where the input is a sentence (stream of characters) with OCR errors and ground-truth is the same sentence with corrections. Encoding engine 312 first converts each input character into an input vector by picking an associated vector representation from visual embeddings 310. Encoding engine 312 then generates a single high dimensional embedding for the input vector stream by combining each of the associated input vectors. This high dimensional embedding is then picked up by decoding engine 314 and decoding engine 314 breaks down the high dimensional embedding into a sequence of vectors which are then converted into character stream based on the proximity of the vector to a character's decoder embedding (which is the same as visual embedding 310). During training, decoder engine 314 utilizes ground-truth information to generate a loss value between the output produced by linguistic learning engine 306 and the desired output which is used to train the encoder-decoder based deep learning linguistic model, i.e. linguistic learning engine 306, to generate correct sentences for erroneous input sentences. Linguistic learning engine 306 may be extended to any language based on the training.

Along with visual embeddings 310 utilized by the linguistic learning system 306, the illustrative embodiments also provide cross-modal training via auxiliary visual embedding updating engine 308, which incorporates a multi-task learning into the proposed system. Auxiliary visual embedding updating engine 308 helps the system "revise and remember" the visual information learned from CNN based visual embedding generation engine 304 while learning about how a language works from linguistic learning system 306. That is, auxiliary visual embedding updating engine 308 updates the decoder character embeddings with respect to randomly drawn character images from character set generation engine 302 to help the model simultaneously learn visual information along with linguistic learning. This process is called a multi-modal multi-task learning where one system (linguistic learning system 306) learns information from different domains (visual, textual, audio, video, etc.) via a set of carefully crafted learning tasks for which the system may or may not use an auxiliary engine. In the illustrative embodiments, auxiliary visual embedding updating engine 308 provides for this learning. Auxiliary visual embedding updating engine 308 ensures that data processing system 300 does not undergo "catastrophic forgetting" while learning language and "revisits" the visual information learned from CNN based visual embedding generation engine 304.

Thus, auxiliary visual embedding updating engine 308 implements an inter-modal triplet loss mechanism to effectively capture heterogeneous correlations across different modalities (namely text and visual). Auxiliary visual embedding updating engine 308 may utilize any contrastive/comparative learning tactic in order to effectively capture heterogeneous correlations across different modalities. Contrastive/comparative learning tactics are the kind in which information from one domain (for example, textual) is compared against the information of the same/similar data (positive data point) in another domain (vision) as well as the information of a very different data (negative data point) in this second domain (vision). This way the system under consideration may update the information from the first domain so that the relationship between the positive and negative data points drawn from the second domain may be incorporated in the first domain as well. Auxiliary visual embedding updating engine 308 implements the inter-modal triplet loss mechanism in order to construct a Siamese architecture where positive and negative instances are images of characters that are selected from the visual domain and the query/anchor instance is the character embedding from decoding engine 314 that is, selected from the linguistic domain. Suppose that the positive instance and the negative instance are images of character, and the query instance is a character. $F \in \mathbb{R}^{k \times N}$ denotes the visual encodings of image modality output from CNN based visual embedding generation engine 304, $G \in \mathbb{R}^{k \times N}$ denotes the encodings of textual modality which is picked up from the embedding layer of decoding engine 314. In the illustrative embodiments, as explained previously, at every iteration, one anchor is sampled from F and a pair of positive and negative instances from G. If T represents the triplet labels, the triplet label likelihood is defined as:

$$p(T|F, G, G) = \prod_{m=1}^{M} p((q_m, p_m, n_m)|F, G, G)$$

where p( ) denotes probability of an occurrence, M is total number of triplets, m is the $m_{th}$ triplet, $q_m$ is a probability of extracting the $m_{th}$ query vector from F, $p_m$ is a probability of extracting $m_{th}$ positive anchor vector from G, and $n_m$ is probability of extracting $m_{th}$ negative anchor vector from G. with $$p(q_m, p_m, n_m)|F,G,G) = \sigma \theta_{q_m{}^y p_m{}^x} - \theta_{q_m{}^y n_m{}^x} - \alpha)$$

where p( ) denotes probability of an occurrence, m is the $m_{th}$ triplet, $q_m$ is a probability of extracting the $m_{th}$ query vector from F, $p_m$ is a probability of extracting $m_{th}$ positive anchor vector from G, $n_m$ is probability of extracting $m_{th}$ negative anchor vector from G, x and y represent the networks with respect to image and embedding (text) modality, respectively, a is a threshold margin, and σ is a sigmoid function and where $$\theta_{q_m{}^y n_m{}^x} = \tfrac{1}{2} G_{*q_m}{}^T F_{*p_m}$$

where *represents the weights and/or parameters of q's model (y) in case of *$q_m$ and the weights and/or parameters of p's model (x) in case of *$p_m$ and where $$\theta_{q_m{}^y n_m{}^x} = \tfrac{1}{2} G_{*q_m}{}^T F_{*n_m}$$

where *represents the weights and/or parameters of n's model (x) in case of *$n_m$. Therefore, the inter-modal triplet loss may be written as:

$$J_1 = -\log p(T|F, G, G)$$
$$= -\sum_{m=1}^{M} \log p(q_m, p_m, n_m|F, G, G)$$
$$= -\sum_{m=1}^{M} \left( \theta_{q_m{}^y p_m{}^x} - \theta_{q_m{}^y n_m{}^x} - \alpha - \log\left(1 + e^{\theta_{q_m{}^y p_m{}^x} - \theta_{q_m{}^y n_m{}^x} - \alpha}\right) \right).$$

Thus, once CNN based visual embedding generation engine 304 generates visual embeddings 310, auxiliary visual embedding updating engine 308 uses visual embeddings 310 to train a multimodal Siamese architecture. A Siamese architecture is one which consists of two identical architecture with shared parameters that generates an encoding for two input vectors to calculate their similarity.

Auxiliary visual embedding updating engine 308 is first trained independently by sampling random images of characters from character set generation engine 302 and mining positive and negative triplets of the characters also from character set generation engine 302. This model is trained until the model is optimized for a desired threshold (a). Once auxiliary visual embedding updating engine 308 is trained, it is referred to as a pretrained auxiliary wing. Now during training of the linguistic learning engine 306, linguistic learning engine 306 uses this auxiliary pretrained wing to update decoding engine's 314 embedding layer towards the visual biases by keeping the weights of pretrained auxiliary visual embedding updating engine 308 fixed and propagating the gradients against loss for a specific threshold (a) to update the embedding layer of decoding engine 314 directly.

In every epoch, auxiliary visual embedding updating engine 308 utilizes a character embedding corresponding to a certain character from an embedding layer of decoding engine 314, such that only one character embedding is selected. Auxiliary visual embedding updating engine 308 mines multiple positive triplets and negative triplets for the selected character. The mined triplets will have a randomized font and size. Therefore, multiple batches of triplets are identified for each character embedding with different combination of positive and negative anchors. Auxiliary visual embedding updating engine 308 then determines an average triplet loss and propagates the average triplet loss backwards while keeping the Siamese architecture parameters for the character fixed. Auxiliary visual embedding updating engine 308 also updates the input embedding with the determined triplet loss. Once determined, auxiliary visual embedding updating engine 308 updates the embedding layer of decoding engine 314 so that decoding engine 314 does not forget the pretrained visual information during rounds of training.

Therefore, the pretrained auxiliary wing is pretrained (before training of the linguistic training in order to compare embeddings and images to identify embedding and images of the same character. This is done using visual embeddings generated from CNN based visual embedding generation engine 304 and images from character set generation engine 302. While training the linguistic learning engine 306, the pretrained auxiliary wing basically works by selecting the embedding of a random character (for example, 'S') from the decoder embedding layer and randomly picking two images from character-set generation (one of the same character & one of a negative example (for example, 'P'). Then, it updates the embedding of the character ('S' in this example) such that the embedding is more related to the image of S than P. Thus, along with the linguistic training where the linguistic engine learns to correct error characters based on meaning of the sentence, auxiliary visual embedding updating engine 308 gives the linguistic system 'eyes' to see which character should have been there visually. For example if the word is '5un' it is able to see that 'sun' would be the best correction.

When a document in which OCR has been performed is received as system input 316, character set generation engine 302 prompts the user to select analysis information that includes a language, font, font type, font parameters, or the like, to be utilized in assessing the document. Using the system input 316 and visual embeddings 310, optical character recognition (OCR) error correction mechanism 300, which has been trained based on the above described methods, utilizes encoding engine 312 and decoding engine 314 to produce the most appropriate correction any encountered error without the need of any ground truth. Thus, utilizing system input 316, i.e. the document from the user in which OCR has been performed, along with the corrections as provided by encoding engine 312, decoding engine 314 outputs an OCR error corrected document to the user. This described method hence instils intelligence in optical character recognition (OCR) error correction mechanism 300 to produce most appropriate correction in sentences (both grammatically and visually plausible) without any handholding or human intervention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
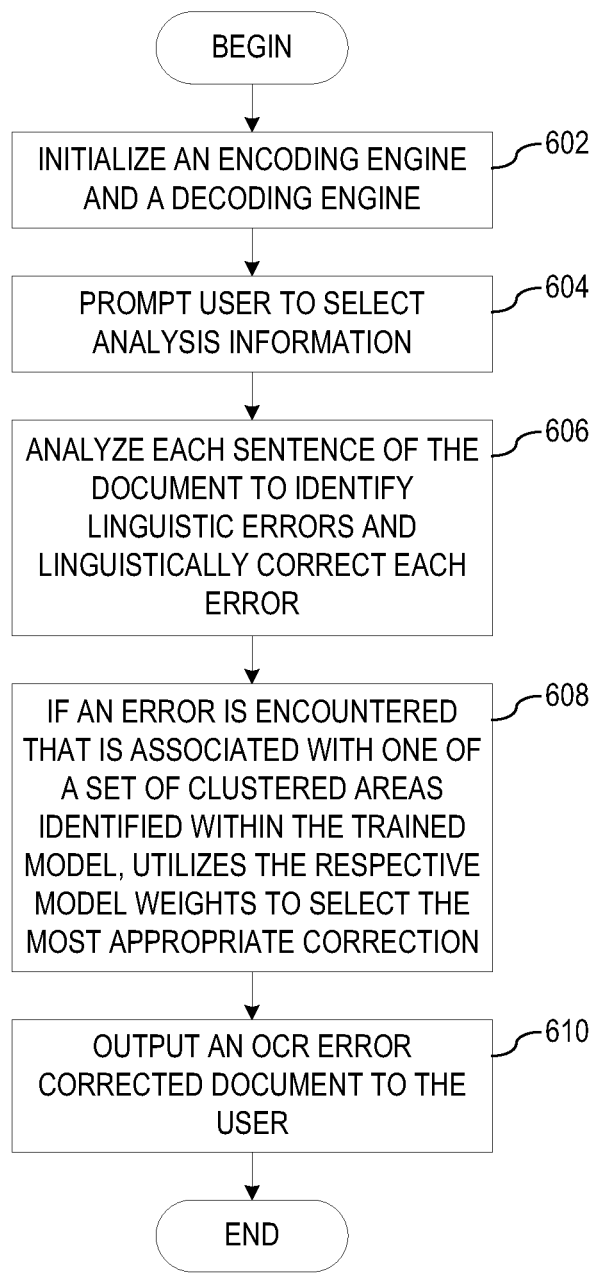
FIG. 6 depicts one example of a flowchart depicting the operation performed in correcting OCR errors utilizing the optical character recognition (OCR) error correction mechanisms of the illustrative embodiments.

FIG. 6 depicts one example of a flowchart depicting the operation performed in correcting OCR errors utilizing the optical character recognition (OCR) error correction mechanisms of the illustrative embodiments. As the operation begins, a linguistic learning engine of the OCR error correction mechanisms initializes an encoding engine and a decoding engine (step 602). When a document in which OCR has been performed is received, the linguistic learning engine prompts the user to select analysis information (step 604) that includes a language, font, font type, font parameters, or the like, to be utilized in assessing the document. Using OCRed document, the analysis information and a trained model, the encoding engine analyzes each sentence of the document to identify linguistic errors and linguistically correct each error (step 606). If encoding engine encounters an error that is associated with one of a set of clustered areas identified within the trained model, the encoding engine utilizes the respective model weights to select the most appropriate correction (step 608). Utilizing the document along with the corrections as provided by the encoding engine, the decoding engine then outputs an OCR error corrected document to the user (step 610), with the operation terminating thereafter.

Figure 7:
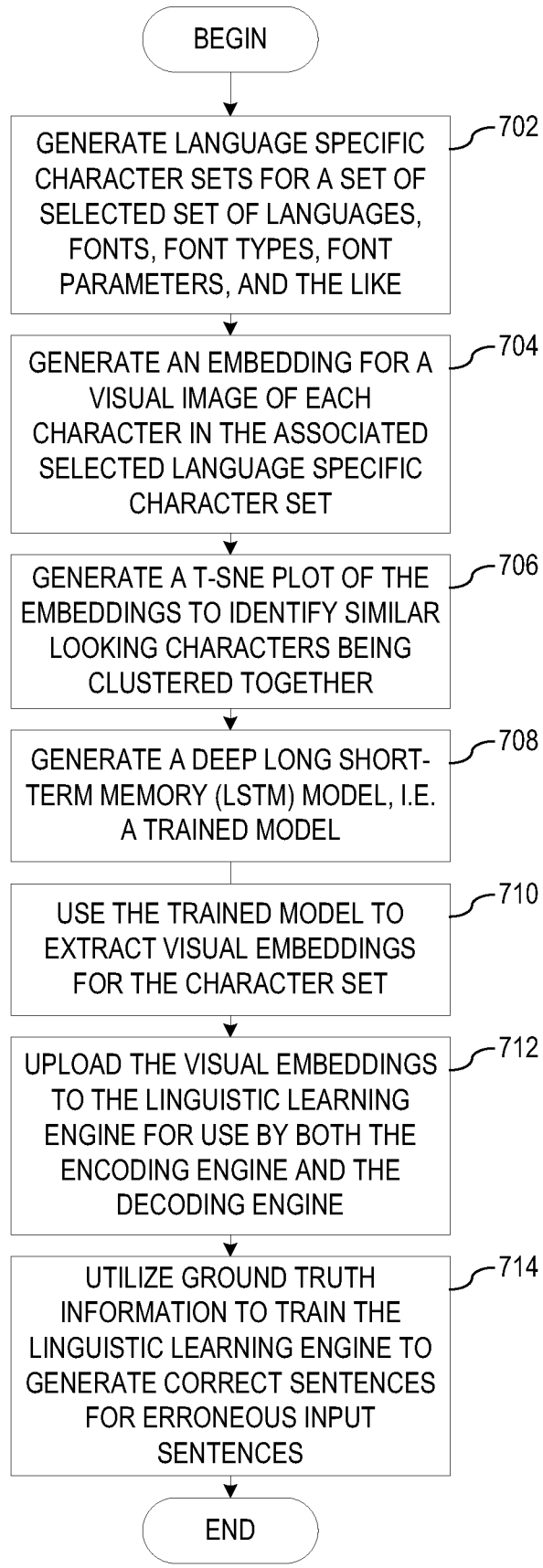
FIG. 7 depicts one example of a flowchart depicting the operation performed in generating a trained model for use in correcting OCR errors utilizing the optical character recognition (OCR) error correction mechanisms of the illustrative embodiments.

FIG. 7 depicts one example of a flowchart depicting the operation performed in generating a trained model for use in correcting OCR errors utilizing the optical character recognition (OCR) error correction mechanisms of the illustrative embodiments. As the operation begins, a character set generation engine of the OCR error correction mechanisms generates language specific character sets for a set of selected set of languages, fonts, font types, font parameters, and the like (step 702). The selected set of languages, fonts, font types, font parameters, and the like may be provided as an input to the character set generation engine from the user, as a predefined set of parameters, or the like. Utilizing the selected language specific character set visual images provided by the character set generation engine, the CNN based visual embedding generation engine of the OCR error correction mechanisms generates an embedding for each character in the associated selected language specific character set visual image (step 704). The CNN based visual embedding generation engine generates embeddings for all images of a character created by permuting various fonts, sizes and capitalization. The CNN based visual embedding generation engine generates a t-distributed stochastic neighbor embedding (t-SNE) plot of the embeddings to identify similar looking characters being clustered together in order to verify that the visual clues in the language specific dataset are identified correctly (step 706).

The CNN based visual embedding generation engine generates a deep long short-term memory (LSTM) model, i.e. a trained model, to learn the linguistic context amongst clusters of characters utilizing the t-SNE plot with the clustered characters (step 708). That is, as spelling errors create new words which may not be present in the dictionary, the CNN based visual embedding generation engine generates a character-level trained model where input to each LSTM unit within the trained model would be a character, i.e. each character in the selected language specific character set visual image provided by the character set generation engine. This introduced character level information in visual domain provides a starting point to utilize inherent correlations amongst characters invisible in the linguistic domain. Thus, the CNN based visual embedding generation engine generates the trained model that provides greater than 99% accuracy when utilized to correct OCR errors. The CNN based visual embedding generation engine then uses the trained model to extract visual embeddings for the character set (step 710) and uploads the visual embeddings to the linguistic learning engine for use by both the encoding engine and the decoding engine (step 712). The decoding engine utilizes ground truth information to train the linguistic learning engine to generate correct sentences for erroneous input sentences (step 714), with the operation terminating thereafter.

Figure 8:
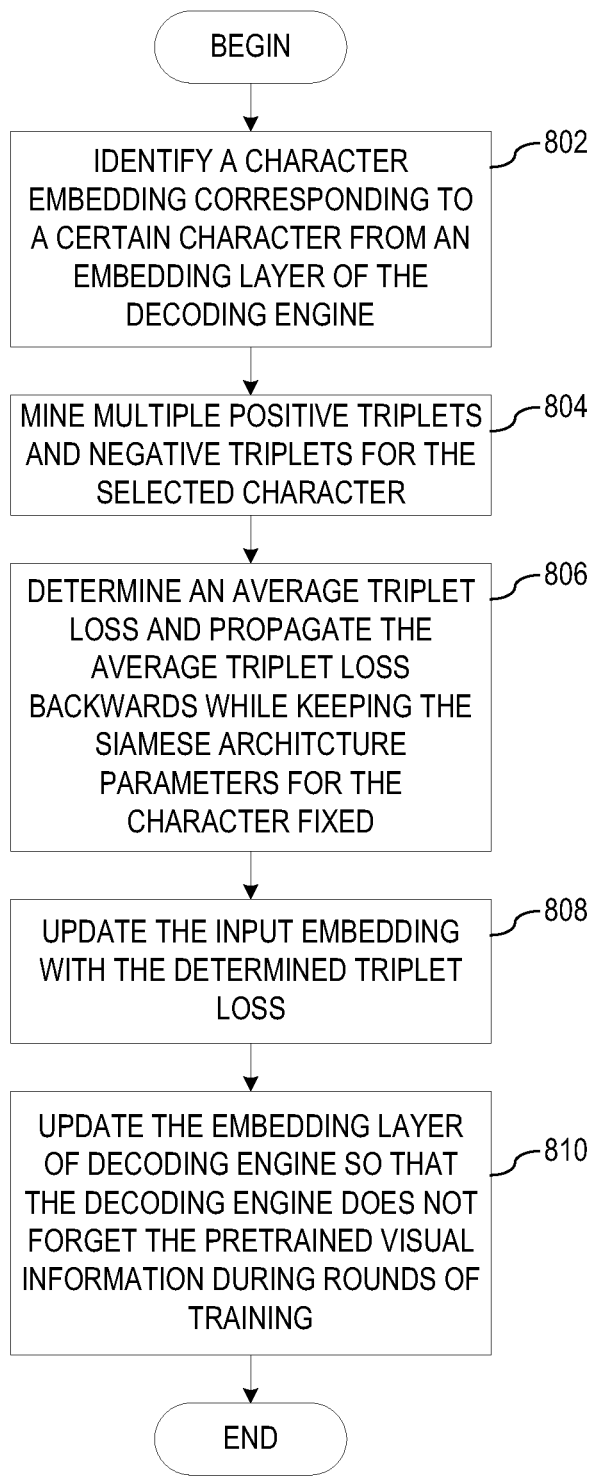
FIG. 8 depicts one example of a flowchart depicting the operation performed in generating a cross-modal trained model for use in correcting OCR errors utilizing the optical character recognition (OCR) error correction mechanisms of the illustrative embodiments.

FIG. 8 depicts one example of a flowchart depicting the operation performed in generating a cross-modal trained model for use in correcting OCR errors utilizing the optical character recognition (OCR) error correction mechanisms of the illustrative embodiments. As the operation begins, the auxiliary visual embedding generation engine identifies a character embedding corresponding to a certain character from an embedding layer of the decoding engine, such that only one character embedding is selected (step 802). The auxiliary visual embedding generation engine mines multiple positive triplets and negative triplets for the selected character (step 804). The mined triplets will have a randomized font and size. Therefore, multiple batches of triplets are identified for each character embedding with different combination of positive and negative anchors. The auxiliary visual embedding generation engine then determines an average triplet loss and propagates the average triplet loss backwards while keeping the Siamese model parameters for the character fixed (step 806). The auxiliary visual embedding generation engine also updates the input embedding with the determined triplet loss (step 808). Once determined, the auxiliary visual embedding generation engine updates the embedding layer of decoding engine so that the decoding engine does not forget the pretrained visual information during rounds of training (step 810), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for enhancing post OCR error correction by inculcating information from linguistic and visual modes. That is, most OCR errors occur due to similarity amongst characters in a visual domain. In order to predict correct options for the OCR error, the instant OCR error correction mechanisms provide for learning the linguistic context of the input word stream. In order to learn from visual as well as linguistic domains, the OCR error correction mechanisms provide a two-step architecture which utilizes information from multiple modes to enhance predictions. That is, the instant OCR error correction mechanisms uses visual information of characters (in various fonts, font properties, or the like) to enhance linguistic error corrections by utilizing visual embeddings of characters as the embedding layer of an attention based bi-directional deep long-short term memory (LSTM) model. Therefore, the OCR error correction mechanisms are trained on multiple languages with varying characters and fonts. The OCR error correction mechanisms is agnostic of prior art mechanisms that use logographic languages and does not look for recurring patterns design in similar words. The OCR error correction mechanisms are also independent of the OCR engine and may be extended to all different fonts used by the user.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, in a data processing system comprising at least one processor and at least one memory, the at least one memory comprising instructions executed by the at least one processor to cause the at least one processor to implement an optical character recognition (OCR) error correction mechanism for correcting OCR errors in a document system, wherein the data processing system operates to:
    responsive to receiving a document in which OCR has been performed, assess the document to identify a set of OCR errors generated by an OCR engine that performed the OCR on the document using a set of visual embeddings;
    responsive to identifying the set of OCR errors, analyze each character of a plurality of sentences within the document to generate a high-dimensional embedding for the characters of the plurality of sentences within the document;
    linguistically correct each OCR error in the set of OCR errors by:
        breaking down the high-dimensional embedding into a sequence of vectors; and
        converting the sequence of vectors into a character stream where each character in the character stream is identified based on a proximity of an associated vector to decoder character embeddings;
    utilize ground truth information and the set of visual embeddings to verify that the character stream is linguistically correct; and
    responsive to verifying that the character stream is linguistically correct, output an OCR error corrected document to a user.

2. The computer-implemented method of claim 1, wherein the set of visual embeddings are learned based on linguistic context of the plurality of sentences as well as visual correlations amongst the characters of the plurality of sentences.

3. The computer-implemented method of claim 1, wherein generating the high-dimensional embedding for the characters of the plurality of sentences within the document comprises: converting each character of the characters of the plurality of sentences into an input vector by picking an associated vector representation from the set of visual embeddings thereby forming an input vector stream; and
    generating the high-dimensional embedding for the input vector stream by combining each of the associated input vectors.

4. The computer-implemented method of claim 1, wherein generating the high-dimensional embedding for the characters of the plurality of sentences within the document utilizes analysis information provided by the user that comprises at least one of a language, a font, a font type, or font parameters.

5. The computer-implemented method of claim 1, wherein the set of visual embeddings is generated by the method comprising:
    generating a language specific character set for a selected set of languages, fonts, font types, and font parameters;
    generating an embedding for a visual image of each character in the language specific character set; and
    encoding each embedding for the visual image of each character in the language specific character set into a fixed length vector thereby forming the set of visual embeddings.

6. The computer-implemented method of claim 1, wherein converting the sequence of vectors into the character stream utilizes cross-modal training.

7. The computer-implemented method of claim 6, wherein the cross-modal training comprises:
    sampling random images of characters from a language specific character set;
    mining positive and negative triplets of each character of the characters from the language specific character set; and
    training a model until a desired threshold is met.

8. The computer-implemented method of claim 7, wherein training the model utilizes contrastive/comparative learning tactics in order to effectively capture heterogeneous correlations across different modalities.

9. A computer program product comprising a computer readable storage medium having a computer readable program stored therein, wherein the computer readable program, when executed on a computing device, causes the computing device to implement an optical character recognition (OCR) error correction mechanism for correcting OCR errors in a document system which operates to:
    responsive to receiving a document in which OCR has been performed, assess the document to identify a set of OCR errors generated by an OCR engine that performed the OCR on the document using a set of visual embeddings;
    responsive to identifying the set of OCR errors, analyze each character of a plurality of sentences within the document to generate a high-dimensional embedding for the characters of the plurality of sentences within the document;
    linguistically correct each OCR error in the set of OCR errors by:

breaking down the high-dimensional embedding into a sequence of vectors; and converting the sequence of vectors into a character stream where each character in the character stream is identified based on a proximity of an associated vector to decoder character embeddings;

utilize ground truth information and the set of visual embeddings to verify that the character stream is linguistically correct; and responsive to verifying that the character stream is linguistically correct, output an OCR error corrected document to a user.

10. The computer program product of claim 9, wherein the set of visual embeddings are learned based on linguistic context of the plurality of sentences as well as visual correlations amongst the characters of the plurality of sentences.

11. The computer program product of claim 9, wherein the computer readable program generates the high-dimensional embedding for the characters of the plurality of sentences within the document by further causing the computing device to: convert each character of the characters of the plurality of sentences into an input vector by picking an associated vector representation from the set of visual embeddings thereby forming an input vector stream; and generate the high-dimensional embedding for the input vector stream by combining each of the associated input vectors.

12. The computer program product of claim 9, wherein generating the high-dimensional embedding for the characters of the plurality of sentences within the document utilizes analysis information provided by the user that comprises at least one of a language, a font, a font type, or font parameters.

13. The computer program product of claim 9, wherein the computer readable program generates the set of visual embeddings by further causing the computing device to:

generate a language specific character set for a selected set of languages, fonts, font types, and font parameters;

generate an embedding for a visual image of each character in the language specific character set; and encode each embedding for the visual image of each character in the language specific character set into a fixed length vector thereby forming the set of visual embeddings.

14. The computer program product of claim 9, wherein the computer readable program converts the sequence of vectors into the character stream utilizing cross-modal training and wherein the cross-modal training further causes the computing device to: sample random images of characters from a language specific character set; mine positive and negative triplets of each character of the characters from the language specific character set; and train a model until a desired threshold is met, wherein training the model utilizes contrastive/comparative learning tactics in order to effectively capture heterogeneous correlations across different modalities.

15. An apparatus comprising:

a processor; and a memory coupled to the processor, wherein the memory comprises instructions which, when executed by the processor, cause the processor to implement an optical character recognition (OCR) error correction mechanism for correcting OCR errors in a document system which operates to:

responsive to receiving a document in which OCR has been performed, assess the document to identify a set of OCR errors generated by an OCR engine that performed the OCR on the document using a set of visual embeddings;

responsive to identifying the set of OCR errors, analyze each character of a plurality of sentences within the document to generate a high-dimensional embedding for the characters of the plurality of sentences within the document;

linguistically correct each OCR error in the set of OCR errors by:

breaking down the high-dimensional embedding into a sequence of vectors; and converting the sequence of vectors into a character stream where each character in the character stream is identified based on a proximity of an associated vector to decoder character embeddings;

utilize ground truth information and the set of visual embeddings to verify that the character stream is linguistically correct; and responsive to verifying that the character stream is linguistically correct, output an OCR error corrected document to a user.

16. The apparatus of claim 15, wherein the set of visual embeddings are learned based on linguistic context of the plurality of sentences as well as visual correlations amongst the characters of the plurality of sentences.

17. The apparatus of claim 15, wherein the instructions generate the high-dimensional embedding for the characters of the plurality of sentences within the document by further causing the processor to: convert each character of the characters of the plurality of sentences into an input vector by picking an associated vector representation from the set of visual embeddings thereby forming an input vector stream; and generate the high-dimensional embedding for the input vector stream by combining each of the associated input vectors.

18. The apparatus of claim 15, wherein generating the high-dimensional embedding for the characters of the plurality of sentences within the document utilizes analysis information provided by the user that comprises at least one of a language, a font, a font type, or font parameters.

19. The apparatus of claim 15, wherein the instructions generate the set of visual embeddings by further causing the processor to:

generate a language specific character set for a selected set of languages, fonts, font types, and font parameters;

generate an embedding for a visual image of each character in the language specific character set; and encode each embedding for the visual image of each character in the language specific character set into a fixed length vector thereby forming the set of visual embeddings.

20. The apparatus of claim 15, wherein the instructions convert the sequence of vectors into the character stream utilizing cross-modal training and wherein the instructions implement the cross-modal training further causes the processor to: sample random images of characters from a language specific character set; mine positive and negative triplets of each character of the characters from the language specific character set; and train a model until a desired threshold is met, wherein training the model utilizes contrastive/comparative learning tactics in order to effectively capture heterogeneous correlations across different modalities.

* * * * *